(12) United States Patent
Cartland et al.

(10) Patent No.: US 6,536,350 B2
(45) Date of Patent: Mar. 25, 2003

(54) STAGNATION PRESSURE ACTIVATED FUEL RELEASE MECHANISM FOR HYPERSONIC PROJECTILES

(75) Inventors: Harry E. Cartland, Menlo Park, CA (US); John W. Hunter, San Diego, CA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/799,572

(22) Filed: Mar. 7, 2001

(65) Prior Publication Data

US 2002/0124758 A1 Sep. 12, 2002

(51) Int. Cl.$^7$ .............................. F42B 15/00; F02K 7/10; F02K 9/08
(52) U.S. Cl. ................. 102/374; 102/520; 102/380; 102/381; 60/251; 244/3.22; 244/130
(58) Field of Search ............... 244/3.22, 130; 102/374, 381, 380, 520; 60/245, 251

(56) References Cited

U.S. PATENT DOCUMENTS

| | | | | |
|---|---|---|---|---|
| 2,570,629 A | * | 10/1951 | Anxionnaz et al. | |
| 2,995,892 A | * | 8/1961 | Kosson et al. | 60/245 |
| 3,903,802 A | * | 9/1975 | Squiers | 102/374 |
| 3,974,648 A | * | 8/1976 | Kepler | 60/251 |
| 4,052,846 A | * | 10/1977 | Schadow | 60/251 |
| 4,291,533 A | * | 9/1981 | Dugger et al. | 102/374 |
| 4,428,293 A | * | 1/1984 | Botwin et al. | 244/3.22 |
| 4,502,649 A | * | 3/1985 | Botwin et al. | 244/3.22 |
| 4,628,688 A | * | 12/1986 | Keirsey | 60/245 |
| 5,363,766 A | * | 11/1994 | Brandon et al. | 102/374 |
| 5,485,787 A | | 1/1996 | Bowcutt et al. | 102/374 |
| 5,513,571 A | | 5/1996 | Grantz et al. | 102/374 |
| 5,862,996 A | * | 1/1999 | Crichton | |

FOREIGN PATENT DOCUMENTS

JP  2150700  * 8/1990 ................. 102/374

* cited by examiner

Primary Examiner—Michael J. Carone
Assistant Examiner—Lulit Semunegus
(74) Attorney, Agent, or Firm—William C. Daubenspeck; Paul A. Gottlieb

(57) ABSTRACT

A propulsion-assisted projectile has a body, a cowl forming a combustion section and a nozzle section. The body has a fuel reservoir within a central portion of the body, and a fuel activation system located along the central axis of the body and having a portion of the fuel activation system within the fuel reservoir. The fuel activation system has a fuel release piston with a forward sealing member where the fuel release piston is adapted to be moved when the forward sealing member is impacted with an air flow, and an air-flow channel adapted to conduct ambient air during flight to the fuel release piston.

10 Claims, 2 Drawing Sheets

STAGNATION PRESSURE ACTIVATED FUEL RELEASE MECHANISM FOR HYPERSONIC PROJECTILES

The United States Government has rights in this invention pursuant to Contract No. W-7405-ENG-48 between the United States Department of Energy and the University of California for Management of the Lawrence Livermore National Laboratory.

BACKGROUND OF THE INVENTION

1. Field of the Invention

The present invention relates to the field of high-speed gun or artillery launched projectiles. Particularly the present invention relates to air-breathing propulsion assisted projectiles, and more particularly to air propulsion assisted projectiles that accelerate after launch. Even more particularly the present invention relates to fuel release systems used in air breathing propulsion systems that accelerate after launch.

2. Description of the Prior Art

The ramjet and supersonic ramjet propulsion cycles for supersonic and hypersonic engines are well known within the art of aerospace propulsion. In ramjet propulsion high velocity air is compressed through a series of forebody and inlet shocks and through a subsonic diffuser all of which decelerate the air to a subsonic velocity near the fuel flame speed. Fuel is injected into a combustor and conventional subsonic combustion increases the temperature and pressure of the fuel-air mix. The high-pressure gas is then expanded through a nozzle increasing the velocity and momentum of the flow to produce thrust. Ramjet can be efficiently used to a velocity of approximately Mach 5. Above Mach 5 the temperatures and pressure associated with decelerating the flow to subsonic speeds for combustion are severe and begin eroding the engine cycle and the engine structure. It is at this point when supersonic combustion ramjet, called scramjet, is the preferred form of propulsion.

For Mach numbers above 5, a principal advantage of scramjet propulsion is that supersonic velocities within the combustion chamber are accompanied by lower static temperatures, pressures, and reduced total pressure losses. By reducing combustion product dissociation, reduced temperatures increase combustion efficiency, reduced pressures decrease loads on engine structure, and reduced total pressure losses increase the flow energy available for thrust production.

Research in supersonic air breathing propulsion systems for aircraft and missiles has been in progress since the 1940's. As empirical knowledge grew on the subject in the 1950's, researchers investigated propulsion for hypersonic aircraft and missiles, using scramjet engines. Research into scramjet propulsion continued during the 1970's at the Nasa Langley Research Center and John Hopkins Applied Physics laboratory, and in the 1980's and 1990's work continued under the auspices of the National Aerospace Plane Program.

Starting in 1993 the Super High Altitude Research Project (SHARP) launched hypersonic air breathing vehicles for the purpose of data development on SCRAM propulsion. SCRAM propulsion has been discussed for several decades and is the cornerstone of many advanced vehicle concepts. The projectiles were launched using the SHARP hypervelocity launcher, which is a two-stage light gas gun. Because the flight duration was short, high specific impulse was required from the engine in order to produce a measurable deviation from pure ballistic flight. This lead to the selection of gaseous hydrogen as the fuel. One drawback of hydrogen is its low energy density. This, coupled with the low fuel volume available on the projectile, means that hydrogen must be stored at high pressure, e.g. 6000–10000 psi, and must not be prematurely released, i.e. before the projectile exits the launch tube. Using the SHARP light gas gun, velocities of up to MACH 9 have been recorded. The greatest advantage of the light gas gun launch is that high Mach number and high Reynolds numbers can be achieved simultaneously in invitiated air (clean). This guarantees that the flow field around a properly scaled model will match that of a full-scale hypersonic vehicle at operational speed and altitude. The primary disadvantage of the gun is that in gun launch there is a high axial acceleration load. In the SHARP test this can exceed 20,000 "g". For this reason it is necessary that a robust mechanical design be implemented for launching the device.

Several devices have been created for use as projectiles for launch from a light gas gun. These devices take advantage of the characteristics inherent in scramjet and ramjet technology, and select hydrogen for its projectile fuel source. Hydrogen is selected as a gas source because, in order to achieve a measurable deviation from ballistic flight, an engine must produce high specific impulse, which is attainable using hydrogen.

U.S. Pat. No. 5,485,787 (1996, Bowcutt et al.) discloses a gas gun launched propulsion assisted scramjet projectile adapted to be fired from a gun preferably at velocities greater then MACH 5. The projectile includes a body with an internal combustion section, i.e. combustor, an external compression section, a nozzle section, and means for channeling fuel to the combustor to produce thrust greater than drag when the projectile travels at velocities greater then Mach 5. The projectile further includes a plurality of circumferentially spaced stabilization fins located at the nozzle end of the body. In addition the device includes a pusher for launching the device and protecting it from propulsive forces of the launch. One disadvantage of this device is that it is prone to fuel leakage and premature activation of the fuel system. A properly functioning fuel source is extremely important because of the low energy density of hydrogen gas. In addition, the projectile does not have provisions for repetitive cycling of the mechanism and testing before launch.

U.S. Pat. No. 5,513,571 (1996, Grantz et al.) discloses an air breathing propulsion assisted projectile designed to be rocket or gun launched and capable of accelerating to hypersonic velocities. This design includes a body having an encompassing cowl, an air compression section, an engine assembly located adjacent the air compression section, and a nozzle section located adjacent the engine assembly. The engine assembly includes apparatus for fuel storage and delivery to a combustion region. The rear end portion of the cowl is configured to direct the exiting combusted air and fuel mixture over the nozzle section of the body.

A scramjet system launched from a light gas gun for scramjet propulsion testing and experiments in a closed test chamber was documented in 1968 by H. H. King and O. P. Prachar in the Air Force Aero Propulsion Laboratory Technical Report AFAPL-TR-68-9. This study represents an early attempt to launch a scramjet-shaped projectile from a gun barrel, and the projectile was too small to contain a fuel source. The experiments were conducted only to assess the flight characteristics of scramjet models. Fuel sources were tested but only in conical shaped forms that did not constitute the principles of scramjet or ramjet technology.

All of these current projectile designs face the significant problem of utilizing their fuel source efficiently. The efficient use of hydrogen is significant because of its low energy density and the low fuel volume available on the projectile. Thus, it is critical that the fuel source is activated at the correct time and that all fuel is combusted. Inefficient fuel use leads to decreased projectile performance.

Therefore, what is needed is a scramjet projectile that incorporates a fuel release mechanism where the projectile design is able to withstand the high acceleration loads of a gun launch. What is further needed is a projectile powered by scramjet propulsion with a fuel activation source that is activated at a correct and consistent time after the projectile has left the gun muzzle. What is still further needed is a projectile that activates the fuel source without leaking or wasting uncombusted fuel.

SUMMARY OF THE INVENTION

It is an object of the present invention to provide an air breathing propulsion assisted projectile capable of travel at hypersonic velocities that will overcome some of the deficiencies and drawbacks of currently known air breathing propulsion assisted projectiles. It is another object of the present invention to provide a novel air breathing propulsion assisted projectile that is capable of acceleration by scramjet combustion operation at hypersonic velocities. It is yet another object of the present invention to provide a fuel injection mechanism that will activate only after the projectile has left the launcher muzzle and will not activate prematurely. It is a further objective of the present invention to provide a fuel activation mechanism that does not leak fuel from the projectile body.

The present invention achieves these and other objectives by providing a hypersonic projectile assembly having a main body, a cowl surrounding the main body, a nozzle formed by the rear end surfaces of the cowl and body, a forebody, and a nosecone. The main body contains a fuel cavity and a fuel activation system that is triggered by air stagnation pressure. The projectile assembly also includes a pusher that engages the aft end of the projectile. The pusher forms a seal between the projectile and the high pressure gas that propels it down the launch tube, and safely transfers the gun acceleration force to the projectile mechanical structure. To optimize specific impulse in scramjet propulsion, the above components must be designed with the following parameters considered: forebody and inlet contraction ratios, inlet efficiency, the fuel mixing efficiency, the combustor efficiency, and the nozzle efficiency.

The nosecone and forebody of the present invention contain an air intake port and channel, which is part of the fuel activation system, leading to a fuel injection activation mechanism. This feature distinguishes the present invention from all known projectiles of similar type. The channel created by the intake is referred to as the "pitot" tube.

Attached to the forebody is the main body of the projectile that houses the fuel cavity, the fuel activation mechanism, and a plurality of fuel distribution channels and fuel injection orifices that lead to the combustor region. Inside the body of the projectile, which is constructed of a metal such as aluminum, is the fuel cavity. The fuel activation mechanism retains the fuel within the fuel cavity. The fuel activation mechanism includes a fuel release piston and a fuel activation pin stop. The fuel activation pin stop is the rearward most portion of the fuel release piston. The fuel release piston, which is positioned within the fuel cavity, seals the fuel cavity to ensure that the fuel does not leak from the fuel cavity and releases fuel into the fuel distribution chamber when activated. To perform these functions, the fuel release piston includes at least two communicably attached sealing members, a forward fuel sealing member and a rear piston member. The forward fuel sealing member seals the fuel within the fuel cavity and prevents the fuel from entering into the fuel distribution chamber until required, i.e. until the projectile leaves the muzzle of the gun. The rear piston member, on the other hand, seals the capillary fueling channel once the fuel release piston is activated during launch. The rear piston member is attached to the channel sealing member, which may or may not be an integral part of the fuel release piston. The rear channel sealing member contains a capillary fixedly attached to the base for fueling the projectile. A taper in the fuel activation mechanism ensures that the piston seats forward during fuel charging. A third sealing member may also be employed for sealing the pitot tube to ensure that the air from the pitot tube and fuel do not mix before the fuel reaches the combustor region of the projectile.

In it's most basic form, the fuel release piston must have a fuel sealing member with a forward surface that acts as the surface on which the air pressure supplied by the pitot tube is applied to activate the fuel system. This may be the pitot tube sealing member if employed or the forward fuel sealing member.

Pressure on the channel sealing member ensures that the forward fuel sealing member of the fuel release piston does not displace prematurely, thus compromising fuel release. The rear piston member is communicably attached to the channel sealing member, which is positioned within a channel that extends into the fuel cavity from the rearward end of the projectile body. The channel sealing member transmits pressure to the fuel release piston, which is communicably attached to the forward fuel sealing member, restricting any movement by the fuel release piston. The channel sealing member rests against the pusher or sabot, which is fitted to the rearward end of the projectile body.

The pusher is fitted to the body only during the in-bore phase of projectile launch. When the projectile and pusher exit the muzzle, drag separates the pusher from the projectile, freeing the channel sealing member, which in turn frees the fuel release piston, thereby allowing stagnation pressure to activate the fuel supply.

The effectiveness of the fuel activation system is very important due to limited fuel storage available on scramjet projectiles. The thrust required for projectile flight at speeds of approximately Mach 9 dictates that the fuel source be hydrogen or like gasses. Gasses such as hydrogen and the like have a low energy density. The low energy densities and minimal storage inherent in high velocity projectile flight dictate that fuel activation be achieved with little waste of fuel. The fuel activation system must initiate fuel delivery at a consistent and correct time. The correct time to initiate fuel activation is the moment the projectile exits the gun muzzle. Activation of the fuel source must also be achieved without leaking fuel from the fuel cavity. After activation the fuel is then routed through the fuel distribution plenum from the fuel cavity to the combustor region of the projectile in which the fuel is mixed with air and ignited.

In free flight, the fuel release piston is subject to primarily four forces. The pressure load (easily calculated from the piston differential cross sectional area and the fuel fill pressure), the o-ring static friction load and the inertial load (estimated from the aerodynamic drag and piston mass), all act forward. The projectile nose is in "clean" air so that the pitot or stagnation pressure, which acts aft, is found from the Rayleigh formula or, alternatively, from the normal shock tables. Once the forces are known, it is a straightforward matter to calculate piston acceleration and the time required to initiate fuel flow past the forward fuel sealing member, through the injectors and into the combustor region. Computational fluid dynamics modeling is not required to predict performance. Though, in the present case, some modeling was performed to ensure that the small normal area presented by the pitot tube inlet would not affect inlet capture or significantly increase projectile drag. This mechanism is made possible by the non-linear scaling of pitot pressure with Mach number and would be less appropriate for more conventional projectile velocities. But at hypersonic velocities, a small opening, which presents minimal cross sectional area to the external air flow, can provide sufficient force to mechanically actuate fuel flow.

The use of pitot pressure at hypersonic velocities is not limited to activation of gaseous fuel flow. Pitot pressure may serve to drive a piston or a diaphragm for the purpose of injecting a liquid fuel. Pitot pressure may also be used to drive other mechanical processes such as the post-launch deployment of control surfaces, e.g. fins and wings. The pitot tube, in conjunction with a transducer and telemetry unit, can concurrently be used to measure projectile velocity.

The channel sealing member in conjunction with the fuel release piston and the pitot tube solve the problems of current projectile designs with respect to eliminating premature fuel release and fuel leakage. The fuel release piston slides into the fuel cavity sealing the fueling capillary channel and releasing the fuel into the combustor when activated by the air flow pressure from the pitot tube. Pressure on the channel sealing member ensures that the fuel release piston is not displaced prematurely. The materials selected allow a high strength weld for making a leak-proof attachment of the fueling capillary to the channel sealing member.

In the embodiment described above the use of only two sealing surfaces allows for some mixing of air and fuel within the fuel distribution lines at the end of the pitot tube. To stop this from occurring, the second embodiment includes a pitot tube sealing member communicably attached to the fuel release piston. The pitot tube sealing member is positioned in between the aforementioned forward fuel sealing member and the air intake pitot tube. In this embodiment the pitot pressure is placed on the face of the pitot tube sealing member and the force is then communicated to the fuel sealing member, which consistent with the first embodiment seals the fuel within the fuel cavity. The pitot tube sealing member seals the pitot tube in front of the fuel distribution lines, and as a result ensures that the air in the pitot tube does not mix with the fuel in the fuel distribution chamber. This is the preferred solution for hydrogen fuel. Without the pitot tube sealing member, the hydrogen fuel, which is at much higher pressure than the pitot stagnation pressure, will spill out of the pitot tube. This produces pressure thrust aft, in the wrong direction. Further, the hydrogen spilling from the nose auto-ignites, which disrupts the flow to the scram inlet. In certain situations, however, such as where solid fuels are used, pre-mixing of fuel and air to partially burn a solid fuel "gas generator" to inject fuel-rich partially combusted gases into the scramjet combustor may be the preferred method.

A third embodiment of the present invention includes a removable nosecone for repetitive cycling tests of the mechanism before launch. To simulate pitot pressure, the nosecone is unscrewed and replaced with a fitting that allows the charged projectile to be connected to a gas cylinder. This allows non-destructive testing of the fuel release mechanism under expected flight stagnation pressure conditions. In practice, fuel flow could be initiated in this manner at pressures within a few percent of design predictions.

Additional advantages and embodiments of the present invention will be set forth in part in the detailed description that follows and in part will be apparent from the description or may be learned by practice of the invention. It is understood that the foregoing general description and the following detailed description are exemplary and explanatory and are intended to provide further explanation of the invention as claimed.

DETAILED DESCRIPTION OF THE PREFERRED EMBODIMENT

Figure 1:
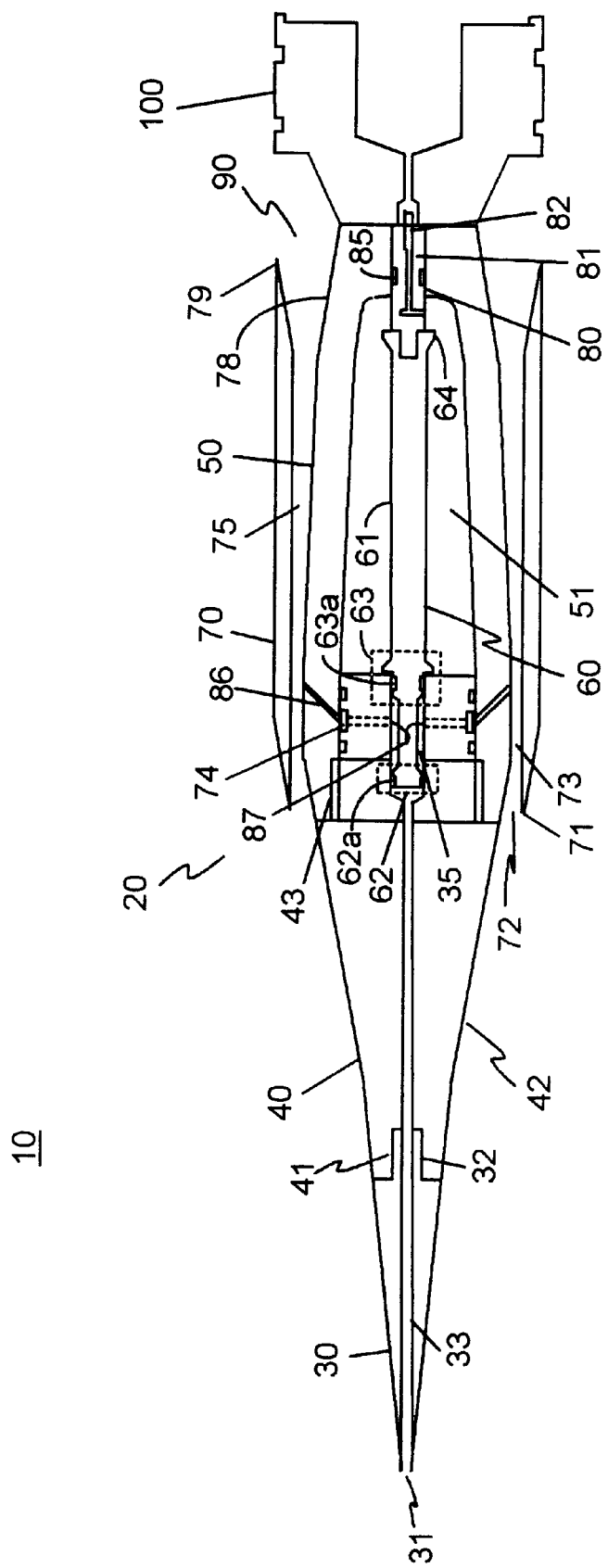
FIG. 1 illustrates an embodiment of the present invention showing the fuel release mechanism with the pitot sealing member.
Figure 2:
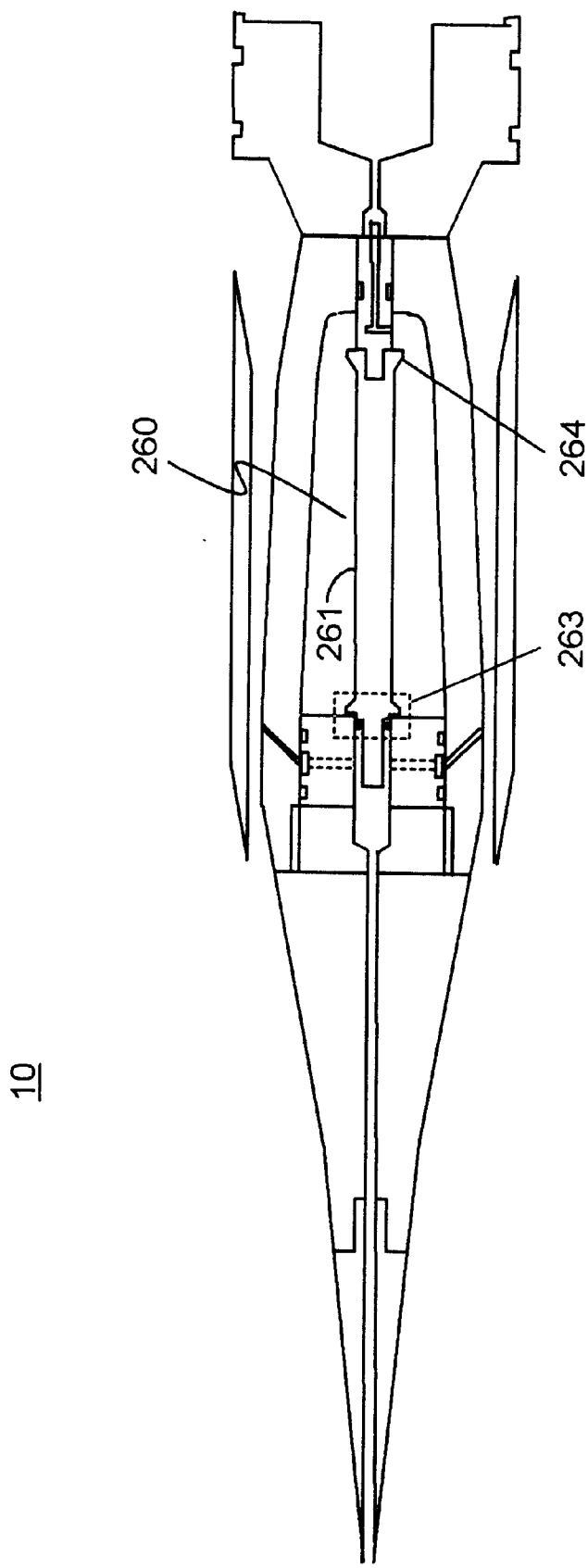
FIG. 2 illustrates an embodiment of the present invention showing the fuel release mechanism without the pitot sealing member.

The preferred embodiment of the present invention is illustrated in FIGS. 1–2. The projectile 10 according to the present invention includes a projectile body 20 and a pusher assembly 100. The projectile is preferably constructed to an overall length of approximately 21". The pusher system 100 is coupled to the projectile body 20 to seal high pressure gas behind the projectile, to safely transfer loads to the projectile structure during launch and to stop premature activation of fuel release before the combined assembly leaves the gun barrel.

The projectile body 20 includes a nosecone 30, a forebody portion 40, a main body 50, a cowl 70 surrounding main body 50, and a nozzle portion 90. The nosecone 30 is approximately 4.9 inches long including a threaded portion 32 and is connected to the forebody 40 through a cooperating threaded fitting 41. In this embodiment, the exposed portion of forebody 40 is 5.1 inches long. It is 7.2 inches long including a threaded section 43 and a fuel distribution chamber 35. In addition to connecting the nosecone 30 to forebody 40 the threaded region 41 allows one to remove nosecone 30 and attach an air-pressure fitting for repetitive static testing and repetitive cycling before launch. By removing the nosecone 30 and connecting the projectile 10 to a gas cylinder, it is possible to simulate pitot pressures.

Nosecone 30 and forebody 40 include an external compression surface 42 extending from the tip of nosecone 30 rearwardly over the forebody 40 into the main body 50 of projectile 10. External surface 42 is configured to compress the fluid through which projectile 10 passes as it travels along its trajectory. Forebody 40 and nosecone 30 also incorporate a channel 33 which extends axially starting from an air intake port 31 of nosecone 30 through forebody 40 to the fuel distribution chamber 35 within forebody 40 of projectile 10. Channel 33 is about a ⅛" diameter tube and from this point will be referred to as a pitot tube 33. The main body 50 is threadably secured to the forebody 40 via threads 43. O-rings are provided on axial sides of the plenum 74 for sealing the connection between main body 50 and forebody 40 as well as plenum 74.

The main body 50 is approximately 8.5" long and houses a fuel activation system 60. Fuel activation system 60 includes a fuel cavity 51 a fuel release piston 61 and a channel sealing member 81. Fuel cavity 51 contains the fuel material in a gaseous state such as hydrogen. The fuel material is installed under high pressure and, in the present design, the pressure is on the order of 7000 psi. Fuel release piston 61 contains the pressurized fuel within fuel cavity 51. Fuel release piston 61 includes a pitot sealing member 62, a forward fuel sealing member 63 and a rear piston member 64. Pitot sealing member 62 includes an O-ring 62*a* that seals the fuel distribution chamber 35 from the air in the pitot tube 33. Rear piston member 64 serves as a piston stop to limit the travel of the fuel release piston 61. Forward fuel sealing member 63 includes an O-ring 63*a* that seals fuel cavity 51 until activation. Channel sealing member 81 abuts the pusher 100 and extends into the main body portion 50 of projectile 10 through a channel 80 located at the rearward end of the main body 50. Channel sealing member 81 prevents fuel release piston 61 from moving. In addition to gaseous fuel, other fuel mediums can be utilized using the current invention.

Main body 50 of the projectile 10 is surrounded by the cowl 70 in such a manner as to create an engine internal flowpath defined by an inlet 72, an isolator 73, a combustion region 75, and an internal nozzle 90. The cowl leading edge 71 and the main body 50 create the inlet 72 to combustion region 75 of projectile 10. Inlet 72 must have a small enough area of contraction to permit the inlet 72 to start airflow. Leading edge 71 of cowl 70 has a radius of approximately 12.5 mils, which is sized to survive aerothermodynamic heating. Leading edge 71 is built up from electro-deposited copper, which is then skim cut to final dimension leaving a leading edge 71 of copper and copper plating on the exterior surface of cowl leading edge. Copper is chosen because copper has the longest "time-to-melt" of commonly available materials. Cowl 70 is connected to main body 50 by eight splitters (not shown) that are spaced circumferentially about main body 50. The splitters serve to segregate adjacent internal flowpaths, which are individually fueled by a plurality of fuel injection channels 86 terminating in the combustion region 75. While not shown here, fuel injectors may also be located in the splitters and or on the cowl 70. The scramjet projectile of the present invention is capable of high "g" accelerations. Although the cowl splitters may be provided with widths that thicken as a function of axial station, in the present invention, the splitters are a robust and constant ¼" thick. This was done to make flowpath analysis easier, to make it easier to do electric discharge machining of the internal flowpaths (the cowl and body are formed from a single piece of aluminum), and to accommodate the crush force on the cowl due to in-bore side loads. It is to be understood that ablative materials or heat sink metals may be used to protect the cowl 70 and splitter structures from high-localized aerodynamic heat loads. Once the fuel is ignited in the combustor region it is expelled through the nozzle section 90.

The nozzle 90 of projectile 10 is defined by the trailing edge 79 of the cowl 70 and a rear external expansion surface 78 of main body portion 50. Rear external expansion surface 78 tapers away from a matching taper on the trailing edge 79 creating an increasing distance between the external expansion surface 78 and the cowl 70 towards the rearward end of projectile 10.

Fuel activation is achieved by a fuel activation system 60 that incorporates the pitot tube 33 and the fuel release piston 61. The pitot tube 33 is connected to the air intake port 31 that is positioned at the tip of nosecone 30 and extends through the forebody 40 to the fuel distribution chamber 35. The fuel release piston 61 is positioned at the end of the pitot tube 33 and acts to seal fuel within the fuel cavity 51 and to prevent fuel release until activated. Fuel release piston 61 extends into fuel cavity 51 and includes three sealing members, pitot sealing member 62, forward fuel sealing member 63, and rear piston member 64. Fuel sealing member 63 contains the fuel within the cavity 51 until fuel activation. Pitot tube sealing member 62 is positioned to receive the air pressure through pitot tube 33 during flight, and is communicably attached to the forward fuel sealing member 63. The pitot tube sealing member 62 is the surface on which the force of the air pressure acts in triggering fuel activation. It also seals the pitot tube 33 from the fuel cavity 51 and the fuel distribution chamber 35. By sealing the pitot tube 33, pitot sealing member 62 ensures that the fuel is not contaminated with the air used to trigger fuel flow. The rear piston member 64 of fuel release piston 61 is communicably connected to the forward fuel sealing member 63 and pitot tube sealing member 62. The primary function of rear piston member 64 is to limit the stroke of the fuel activation system 60, thereby maintaining the integrity of the pitot tube seal and preventing air from mixing with fuel in fuel distribution chamber 35. Rear piston member 64 also functions to seal off the capillary channel 82 during fuel activation to prevent fuel leakage when channel sealing member 81 is disengaged from pusher 100 after projectile 10 leaves the gun barrel during launch. Pin channel 80 is sealed by O-ring sealing member 85 at all times.

Contacting the rear piston member 64 of the fuel release piston 61 is a channel sealing member 81 which extends through the rearward end of the fuel cavity 51 to the aftmost end of the nozzle portion 90 of the projectile. The channel 80 is preferably disposed centrally along the longitudinal axis of the projectile 10 and has a ½" diameter. Channel sealing member 81 applies pressure from the pusher 100, which is temporarily connected to the main body 50 of the projectile 10, to the rear piston member 64 of the fuel release piston 61 restricting the movement of the fuel release piston 61. Channel sealing member 81 insures that the seal will remain for as long as the pusher 100 and the projectile 10 are connected, i.e. while in the gun launch tube. This ensures that the fuel activation system 60 will only be triggered after the projectile 10 and pusher 100 have left the muzzle of the gun. Once the pusher 100 and projectile 10 leave the muzzle, the aerodynamic drag on pusher 100 will cause it to separate from the projectile body 10. As the pusher 100 separates, channel sealing member 81 is allowed to slide in response to the air pressure provided by pitot tube 33 to pitot sealing member 62. As the forward sealing member 63 releases the fuel into the fuel distribution chamber 35, the rear piston member 64 of the fuel release piston 61 closes capillary channel 82. This ensures that there is no leakage of uncombusted fuel through capillary channel 82 and that all of the fuel in the fuel cavity 51 is directed through the forward end of the fuel cavity 51 into fuel distribution chamber 35 and a plurality of fuel distribution channels 86 to the combustion region 75.

The process of directing the released fuel to the combustion region 75 of the projectile 10 begins at the fuel distribution chamber 35 when the fuel release mechanism 61 is activated. Fuel distribution chamber 35 extends from the fuel cavity 51 forwardly to a plurality of fuel distribution channels 87 that are disposed at a predetermined radial orientation to the longitudinal axis of projectile body 20. The outer radial extent of each fuel distribution channel 87 is coupled to a toroidal fuel plenum 74 opposite cowl 70 and downstream of inlet 72. Fuel plenum 74 communicates with the injection channels 86 for distributed delivery of the fuel material to the internal engine flowpaths at a location between the isolator 73 and the combustion region 75.

A second embodiment illustrated in FIG. 2 includes a fuel activation system 260 where the fuel release piston 261 has only two sealing members, air pressure/forward fuel sealing member 263 and rear piston member 264. Rear piston member 264 is identical to the rear piston member 64 in FIG. 1 and serves the same function. Air pressure/forward fuel sealing member 263 performs the combined function of the pitot tube sealing member 62 and the forward fuel sealing member 63 in FIG. 1. A disadvantage of this second embodiment is that without the pitot tube sealing member 62 the air introduced through pitot tube 33 can mix with the fuel as it is distributed through fuel distribution channels 86 to combustion region 75. In addition, the hydrogen fuel, which is at much higher pressure than the pitot stagnation pressure, will spill out of the pitot tube. This produces pressure thrust aft, in the wrong direction. Further, the hydrogen spilling from the nose auto-ignites, which disrupts the flow to the scram inlet. In certain situations, however, such as where solid fuels are used, pre-mixing of fuel and air to partially burn a solid fuel "gas generator" to inject fuel-rich partially combusted gases into the scramjet combustor may be the preferred method.

The present invention functions in the following manner. The projectile is rammed and then charged through a capillary 82 welded to the base of the channel sealing member 81 of the fuel activation mechanism 60. A taper in the mechanism ensures that the piston seats forward during charging. The taper is not a true taper in the sense of a gradual change in diameter. It is the seal 63 to seal 85 size differential, i.e. seal 63 is slightly larger than seal 85, 0.500" versus 0.492" diameter respectively. The gun is fired, the capillary is severed, and the fuel release piston 61 is held forward against its inertial load by pressure transmitted through the channel sealing member 81 from the pusher 100 as it travels down the launch tube. After projectile 10 leaves the muzzle, the high drag pusher 100 rapidly disengages under the high dynamic pressure load on the forward face of the pusher 100. In free flight, the fuel release piston 61 is subject to the four forces previously described and is mechanically activated by the stagnation pressure in the pitot tube 33. Fuel is then allowed to enter the fuel chamber 35 and flows out through the fuel injection channels 86 into the combustion region 75. While in the launch tube of the gun, pusher 100 seals the high pressure gas behind the projectile 10 and provides a mechanism for transferring the load to the base of projectile 10. The internal fuel system for projectile 10 may also be fitted with a regulator to keep the flow rate in the injectors constant.

Once the projectile 10 and pusher 100 separate the stability of the projectile in flight may be increased by providing a plurality of stabilization fins integrated within selected splitters or at the outside back end of cowl 70. Although not shown, the span of these fins and hence their area could be increased beyond the barrel diameter using control surfaces internal to the projectile that deploy after the projectile clears the muzzle. As previously mentioned, pitot tube pressure may also be used to deploy these fins.

Many modifications and variations of the present invention are possible in light of the above teachings. It is therefore to be understood that within the scope of the appended claims the invention may be practiced otherwise than as specifically described.

What is claimed is:

1. A gun-launched, propulsion-assisted projectile comprising:
   a body having a compression section and a cowl forming a combustion section and a nozzle section;
   a fuel reservoir within a central portion of said body; and
   a fuel activation system located along the central axis of said body and having a portion of said fuel activation system within said fuel reservoir, said fuel activation system comprising:
      a fuel release piston with a forward fuel sealing member wherein said fuel release piston is adapted to be moved when said forward sealing member is impacted with an air flow; and
      an air-flow channel adapted to conduct ambient air during flight to said fuel release piston.

2. The projectile of claim 1 wherein said fuel release piston includes a rear sealing member spaced from said forward fuel sealing member and disposed within said fuel reservoir.

3. The projectile of claim 1 wherein said fuel release piston includes a pitot sealing member spaced forwardly of said forward fuel sealing member and adapted to receive said air during flight.

4. The projectile of claim 3 wherein the distance between said pitot sealing member and said forward fuel sealing member is sufficient to prevent said air from mixing with fuel from said fuel reservoir when said fuel release piston is activated.

5. The projectile of claim 1 wherein said air-flow channel is located along the central axis of said body.

6. A fuel release mechanism for use in a propulsion-assisted projectile comprising:
   a fuel release piston having a forward fuel sealing member adapted to seal a fuel exit port of a fuel reservoir of said projectile; and
   an air-flow channel forward of said fuel release piston and adapted to provide an air-flow pressure from ambient air during flight to said forward fuel sealing member for activating said fuel release piston.

7. The fuel release mechanism of claim 6 wherein said fuel release piston further includes an air-flow channel sealing member forward of said forward fuel sealing member, said air-flow channel sealing member adapted for receiving said air-flow pressure causing activation of said fuel release piston.

8. The fuel release mechanism of claim 6 wherein said fuel release piston further includes a rear channel sealing member spaced rearwardly from said forward fuel sealing member, said rear channel sealing member adapted to seal a rear fuel filling aperture when said fuel release piston is activated.

9. A method of reducing premature fuel release in a propulsion-assisted projectile, said method comprising:
   providing a fuel release mechanism having a fuel release piston with at least a fuel release sealing member communicably engaged with a fuel exit aperture;
   incorporating an air-flow channel forward of a fuel release piston and adapted to receive an air flow of ambient air during flight of said projectile, said air-flow channel being in communication with said fuel release sealing member; and
   adapting said fuel release piston to disengage said fuel release sealing member from said fuel exit aperture when said air flow of ambient air engages said fuel release sealing member during flight.

10. The method of claim 9 further includes providing an air-flow channel sealing member on said fuel release piston spaced forward of said fuel release sealing member wherein said air-flow channel sealing member is adapted to receive said air flow from said air-flow channel, said air-flow channel sealing member further adapted to prevent said air flow and fuel from said fuel exit aperture from mixing.

* * * * *